A. S. WARREN.
Hedge-Plashing Machine.
No. 206,282. Patented July 23, 1878.
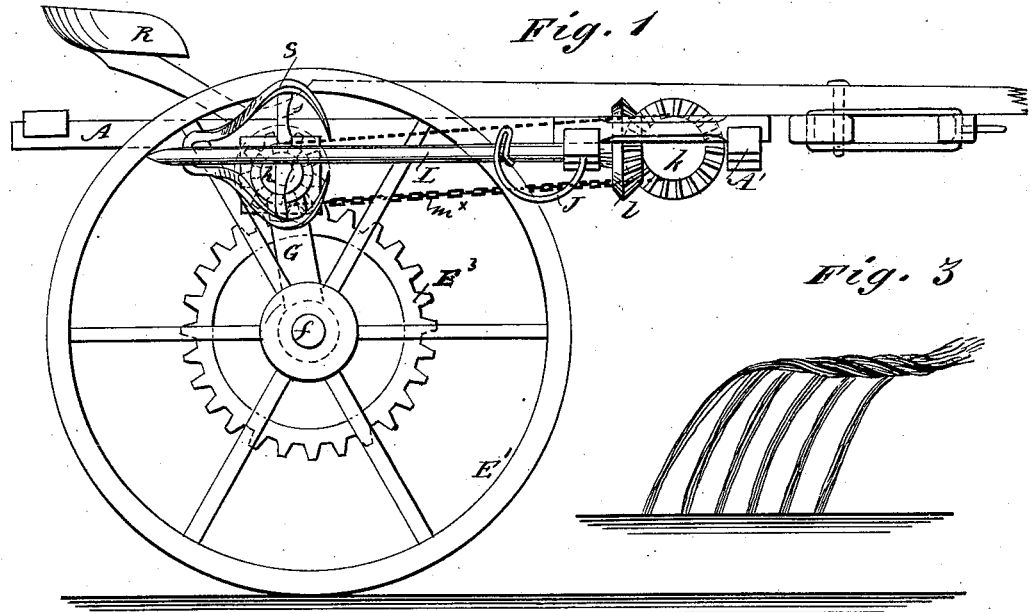
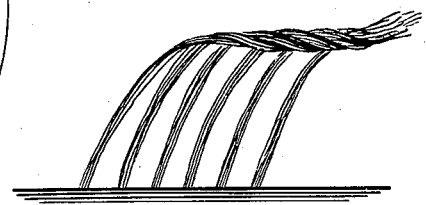
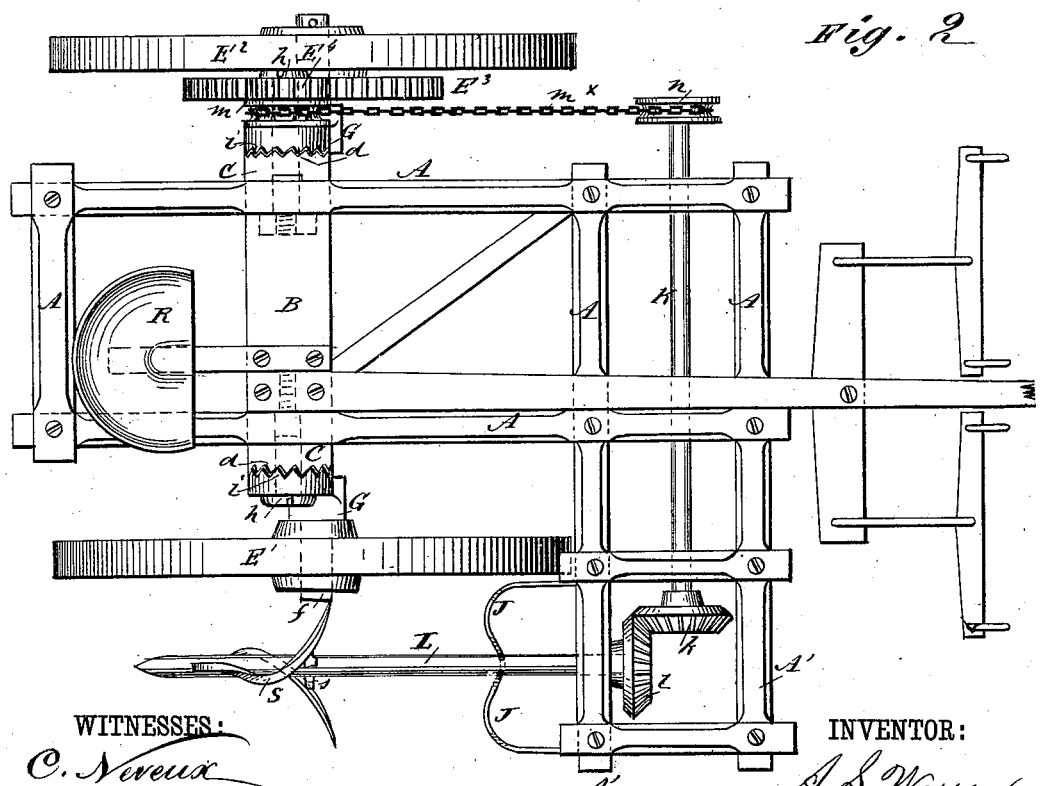
WITNESSES:
C. Neveux
C. Sedgwick
INVENTOR:
A. S. Warren
BY Munn & Co
ATTORNEYS.

UNITED STATES PATENT OFFICE.

ALVA S. WARREN, OF ATLAS, ILLINOIS.

IMPROVEMENT IN HEDGE-PLASHING MACHINES.

Specification forming part of Letters Patent No. 206,282, dated July 23, 1878; application filed May 4, 1878.

*To all whom it may concern:*

Be it known that I, ALVA S. WARREN, of Atlas, in the county of Pike and State of Illinois, have invented new and useful Improvements in Hedge-Trimming Machines, of which the following is a specification:

My invention relates to a machine for laying or bending the hedge, instead of cutting or breaking it down; and it consists in a novel construction, arrangement, and combination of devices for gathering the upper branches of the hedge, and for twisting them into a rope-like form, whereby the upper portion of the hedge is made to present a neat and uniform appearance throughout, and is at the same time greatly strengthened.

In carrying out my invention, I employ a frame-work mounted on wheels and drawn by one or more horses. This frame-work carries a device for dividing the upper portion of the hedge, and gathering it on either side of a shaft lying parallel with the line of travel of the machine. This shaft has a rotary motion imparted to it from one of the wheels of the machine by means of an endless chain, pulleys, and gearing; and it carries a device for engaging with the branches of the hedge and twisting them into a rope-like form. The wheels are hung on spindles carried by arms, which are attached to the axle-tree by means of caps, bolts, and ratchets, by which means the machine may be adjusted to suit the height of the hedge.

The accompanying drawing illustrates the manner of carrying out my invention.

Figure 1 is a side view of a machine embodying my improvements. Fig. 2 is a top view of the same. Fig. 3 is a view of a portion of a hedge, showing the manner in which the branches are twisted into a rope-like form.

Similar letters of reference indicate corresponding parts.

The frame-work A may be of any suitable construction. It is here shown as composed of longitudinal bars and transverse braces, with a lateral extension, A', on one side. The frame-work is attached to an axle-tree, B, at the ends of which are caps or boxes C C, with ratchets $d\ d$ on their outer sides. The wheels $E^1\ E^2$ are hung on spindles $f\ f$ at the lower ends of arms G G, the upper portions of which have ratchets $i\ i$ on their inner sides for engagement with the ratchets $d\ d$. The arms G G are attached to the axle-tree B by means of screw-bolts $h\ h$ passing through the upper portions of the arms and into the ends of the axle-tree, which may be provided with mortises, having nuts fitted therein.

By loosening the screw-bolts the arms may be inclined from a vertical position, and the relative engagement of the ratchets $d\ d$ and $i\ i$ may be changed, so as to adjust the level of the frame-work to the height of the hedge, and then by tightening the screw-bolts the frame-work is securely held at such adjusted level.

In the front portion of the frame-work A is a horizontal shaft, K, having its bearings attached to said frame-work, and running transversely thereof. At one end of this shaft is a pulley, $n$, and at the other end a bevel-gear, $k$. The screw-bolt $h$, which secures to the axle-tree the arm G nearest the driving-wheel $E^2$, is here shown as forming the bearing for a pulley, $m$, secured to a pinion, $E^4$, which meshes into and is driven by a gear-wheel, $E^3$, carried by the driving-wheel $E^2$. An endless band or chain, $m^\times$, passes around the two pulleys $m\ n$.

In the lateral extension A' of the frame-work is journaled a horizontal shaft, L, running parallel with the line of travel of the machine, and carrying a bevel-gear, $l$, meshing into and driven by the bevel-gear $k$ on the shaft K.

The gathering device J is attached to the extension A', and consists of a stout wire, bent upward midway of its length on each side of the shaft L; then transversely of said shaft in opposite directions; then downward and again upward longitudinally of said shaft; and then its ends are secured to the frame-work extension.

The twisting device S is carried by the shaft L, near its rear end, and consists of two prongs curved spirally in opposite directions, after the manner of the prongs of a cork-screw, and said two prongs are connected and strengthened by a brace, $s$, running from one to the other and attached to the shaft L.

The machine is provided with a seat, R, for the driver, and it may be furnished with thills or a tongue, as may be preferred.

The operation is as follows: The frame-work having been adjusted to the desired level, the machine is driven along parallel with the hedge, so that the extension A' passes over and bends down the upper branches. As said upper branches clear the frame-work they are caught by the gatherer J and divided into two portions on either side of the shaft L, and again pressed or bent downward. They are then caught by the twister S, which, as it revolves, twists them into a rope-like form, as illustrated in Fig. 3. Thus the upper portion of the hedge is made to present a neat, symmetrical, and uniform appearance, and the entire hedge is greatly strengthened.

The shaft L may be so arranged as to place the twister S nearer to or farther from the extension A', and the gatherer J may be made adjustable nearer to or farther from the twister.

Having thus described my invention, I claim as new and desire to secure by Letters Patent—

1. The gatherer J, constructed as described, in combination with the frame-work extension A' and the shaft L, for bending, gathering, and dividing the upper branches of the hedge, substantially as herein set forth.

2. The twisting device mounted upon shaft L at its rear end, consisting of two prongs curved spirally in opposite directions, and connected together and to the shaft by a brace, as shown and described.

ALVA SMITH WARREN.

Witnesses:
J. G. ADAMS,
J. M. HENRY.